United States Patent
Graumann et al.

(10) Patent No.: US 9,591,118 B2
(45) Date of Patent: Mar. 7, 2017

(54) POSE TO DEVICE MAPPING

(75) Inventors: David L. Graumann, Portland, OR (US); Giuseppe Raffa, Beaverton, OR (US); Lama Nachman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1313 days.

(21) Appl. No.: 12/347,999

(22) Filed: Jan. 1, 2009

(65) Prior Publication Data

US 2010/0169781 A1   Jul. 1, 2010

(51) Int. Cl.
- *G06F 3/16* (2006.01)
- *H04M 1/725* (2006.01)
- *G06F 3/01* (2006.01)
- *H04M 1/60* (2006.01)

(52) U.S. Cl.
CPC ........... *H04M 1/7253* (2013.01); *G06F 3/011* (2013.01); *G06F 3/167* (2013.01); *H04M 1/6066* (2013.01); *H04M 2250/02* (2013.01); *H04M 2250/12* (2013.01)

(58) Field of Classification Search
USPC ................ 715/701, 702, 727, 729, 863–865; 345/156
See application file for complete search history.

(56) References Cited

U.S. PATENT DOCUMENTS

| | | | |
|---|---|---|---|
| 5,229,756 A * | 7/1993 | Kosugi et al. | 345/156 |
| 5,616,078 A * | 4/1997 | Oh | 463/8 |
| 6,347,290 B1 * | 2/2002 | Bartlett | 702/150 |
| 6,369,794 B1 * | 4/2002 | Sakurai et al. | 345/156 |
| 6,641,482 B2 * | 11/2003 | Masuyama et al. | 463/44 |

(Continued)

FOREIGN PATENT DOCUMENTS

| | | |
|---|---|---|
| CN | 1369168 A | 9/2002 |
| CN | 1784647 A | 6/2006 |

(Continued)

OTHER PUBLICATIONS

Office Action received for Chinese Patent Application No. 201010003244.7, mailed on Sep. 15, 2011, 11 pages of Office Action and 10 pages of English Translation.

(Continued)

*Primary Examiner* — Dino Kujundzic
(74) *Attorney, Agent, or Firm* — Schubert Law Group PLLC

(57) ABSTRACT

Embodiments may comprise logic such as hardware and/or code to map content of a device such as a mobile device, a laptop, a desktop, or a server, to a two dimensional field or table and map user poses or movements to the coordinates within the table to offer quick access to the content by a user. Many embodiments, for example, utilize three wireless peripherals such as a watch, ring, and headset connected to a mobile Internet device (MID) comprising an audible user interface and an auditory mapper to access to the content. The audible user interface may communicatively couple with the peripherals to receive pose data that describes the motion or movements associated with one or more of the peripherals and to provide feedback such as audible items and, in some embodiments, other feedback.

30 Claims, 11 Drawing Sheets

(56) References Cited

U.S. PATENT DOCUMENTS

| | | | |
|---|---|---|---|
| 6,744,420 B2* | 6/2004 | Mohri | 345/157 |
| 6,978,127 B1* | 12/2005 | Bulthuis et al. | 455/412.1 |
| 7,898,522 B2* | 3/2011 | Hildreth et al. | 345/156 |
| 8,456,420 B2* | 6/2013 | Nachman et al. | 345/158 |
| 2002/0167699 A1* | 11/2002 | Verplaetse et al. | 359/158 |
| 2005/0212751 A1* | 9/2005 | Marvit et al. | 345/156 |
| 2008/0229206 A1* | 9/2008 | Seymour et al. | 715/727 |
| 2009/0117945 A1* | 5/2009 | Mahler et al. | 455/569.1 |
| 2009/0221368 A1* | 9/2009 | Yen et al. | 463/32 |
| 2010/0169781 A1 | 7/2010 | Graumann et al. | |
| 2010/0220063 A1* | 9/2010 | Fei | 345/173 |

FOREIGN PATENT DOCUMENTS

| | | |
|---|---|---|
| CN | 101325768 A | 12/2008 |
| JP | 8115335 | 5/1996 |
| JP | 200772564 | 3/2007 |
| TW | I283127 | 6/2007 |
| TW | 200808007 A | 2/2008 |
| TW | I297250 B | 5/2008 |
| WO | 0144912 A2 | 6/2001 |
| WO | 2004102285 A2 | 11/2004 |

OTHER PUBLICATIONS

Office Action received for Chinese Patent Application No. 201010003244.7, mailed on Jun. 15, 2012, 19 pages of office action including 9 pages of English translation.

Office Action received for Chinese Patent Application No. 201010003244.7 mailed on Mar. 26, 2013, 13 pages of Office Action including 8 pages of English Translation.

Office Action received for Taiwan Patent Application No. 098145900, mailed on Nov. 15, 2013, 11 pages of Office Action Including 5 pages of English Translation and 2 pages of search report.

Notice of Allowance received for Taiwan Patent Application No. 098145900, mailed on Apr. 16, 2014, and 2 pages.

Chinese Office Action Received for Chinese Patent Application No. 201010003244.7, mailed on Oct. 17, 2012, 20 Pages of Office Action including 10 Pages of English Translation. 20 Pages of Office Action including 10 Pages of English Translation.

Notice of Allowance received for Chinese Patent Application No. 201010003244.7, mailed on Aug. 21, 2013, 4 pages including 2 pages of English translation.

Japanese Office Action received for Japanese Patent Application No. P2009-299083, mailed on Jul. 17, 2012, 10 pages of Office Action including 8 pages of English Translation.

Notice of Allowance received for Japanese Patent Application No. P2009-299083, mailed on May 27, 2013 and 6 pages including 3 pages of English translation.

Hachet, M., Pouderooux, J., Tyndiuk, F., Guitton, P.: Jump and Refine for Rapid Pointing on Mobile Phones in Proceedings of CHI 2007, May 2007, pp. 167-170, San Jose, CA, USA.

Marentakis, G. and Brewster, S., A. A study on gesture interaction with a 3D Audio Display, in Mobile HCI, 2004, p. 180-191, vol. 3160, Springer LNCS, Glasgow, UK.

Pirhonen, A., Brewster, S. A., and Holguin, C. Gestural and audio metaphors as a means of control for mobile devices, Proceedings of ACM CHI 2002, Apr. 2002, pp. 291-298, ACM Press Addison Wesley, Minneapolis, MN, USA.

Shengdong Zhao, Pierre Dragicevic, Mark Chignell, Ravin Balakrishnan, Patrick Baudisch, Earpod: eyes-free menu selection using touch input and reactive audio feedback, Proceedings of the SIGCHI conference on Human factors in computing systems, Apr. 28-May 3, 2007, pp. 1395-1404, ACM Press, San Jose, CA, USA.

Anthony Savidis, Constantine Stephanidis, Andreas Korte, Kai Crispien, Klaus Fellbaum, A generic direct-manipulation 3D-auditory environment for hierarchical navigation in non-visual interaction, Proceedings of the second annual ACM conference on Assistive technologies, 1996, p. 117-123, Apr. 11-12, 1996, ACM Press, Vancouver, British Columbia, CA.

Naomi Friedlander, Kevin Schlueter, Marilyn Mantei, Bullseye! when Fitts' law doesn't fit, Proceedings of the SIG CHI conference on Human factors in computing systems, pp. 257-264, Apr. 1998, Los Angeles, CA, USA.

Stephen A. Brewster, Using nonspeech sounds to provide navigation cues, ACM Transactions on Computer-Human Interaction (TOCHI), Sep. 1998, ACM Press, pp. 224-259, v. 5 n. 3, Glasgow, UK.

Durand R. Begault, 3-D sound for virtual reality and multimedia, Academic Press Professional, Inc., Apr. 2000, pp. 246, National Aeronautics and Space Administration, Ames Research Center, Moffett Field, CA.

Xiaoyu Chen, Marilyn Tremaine, Robert Lutz, Jae-Woo Chung, Patrick Lacsina, AudioBrowser: A mobile browsable information access for the visually impaired, Universal Access in the Information Society, pp. 4-22, Jun. 2006, vol. 5 Issue 1, Publisher: Springer-Verlag, Information Systems Department, New Jersey Institute of Technology, Newark, NJ, USA.

* cited by examiner

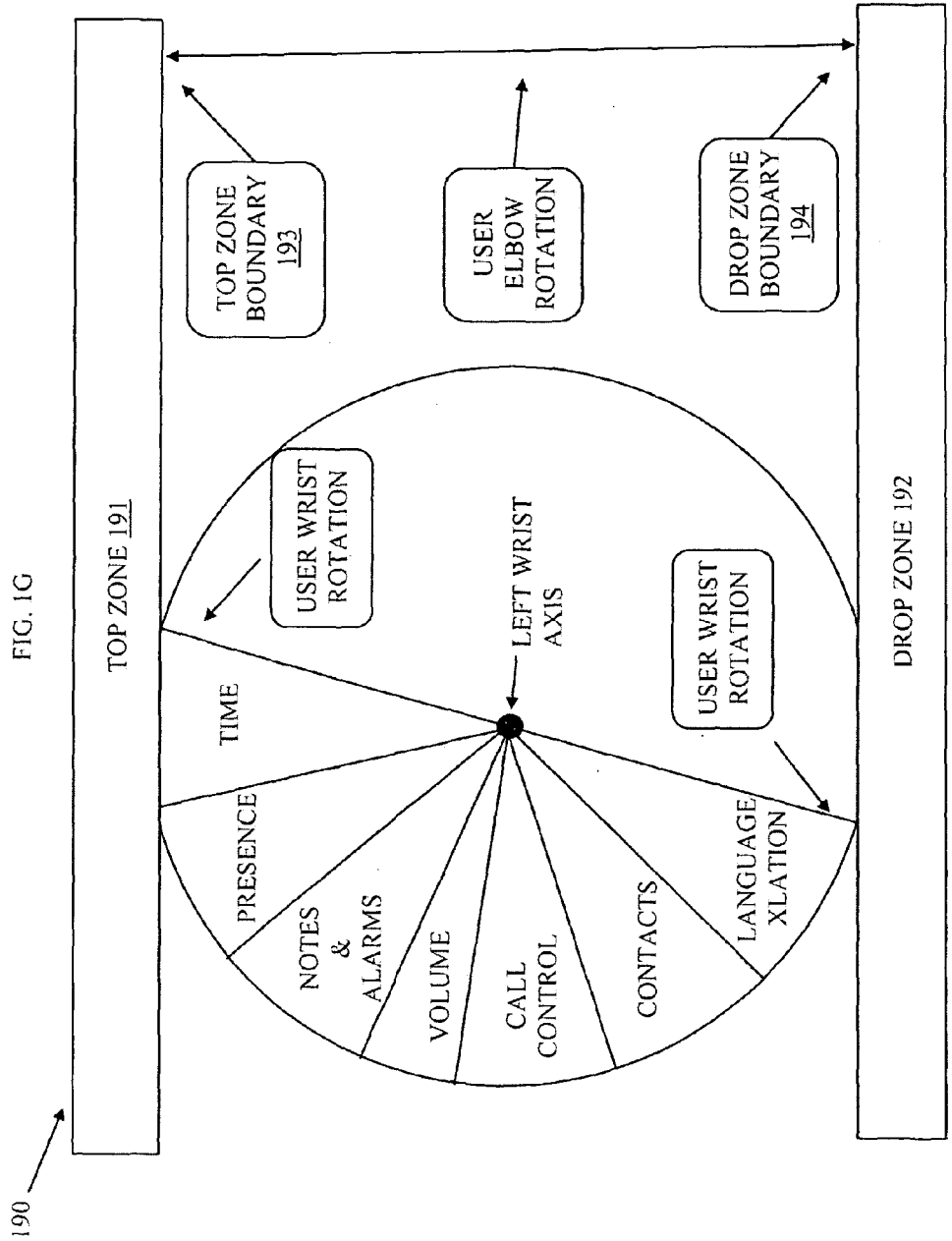

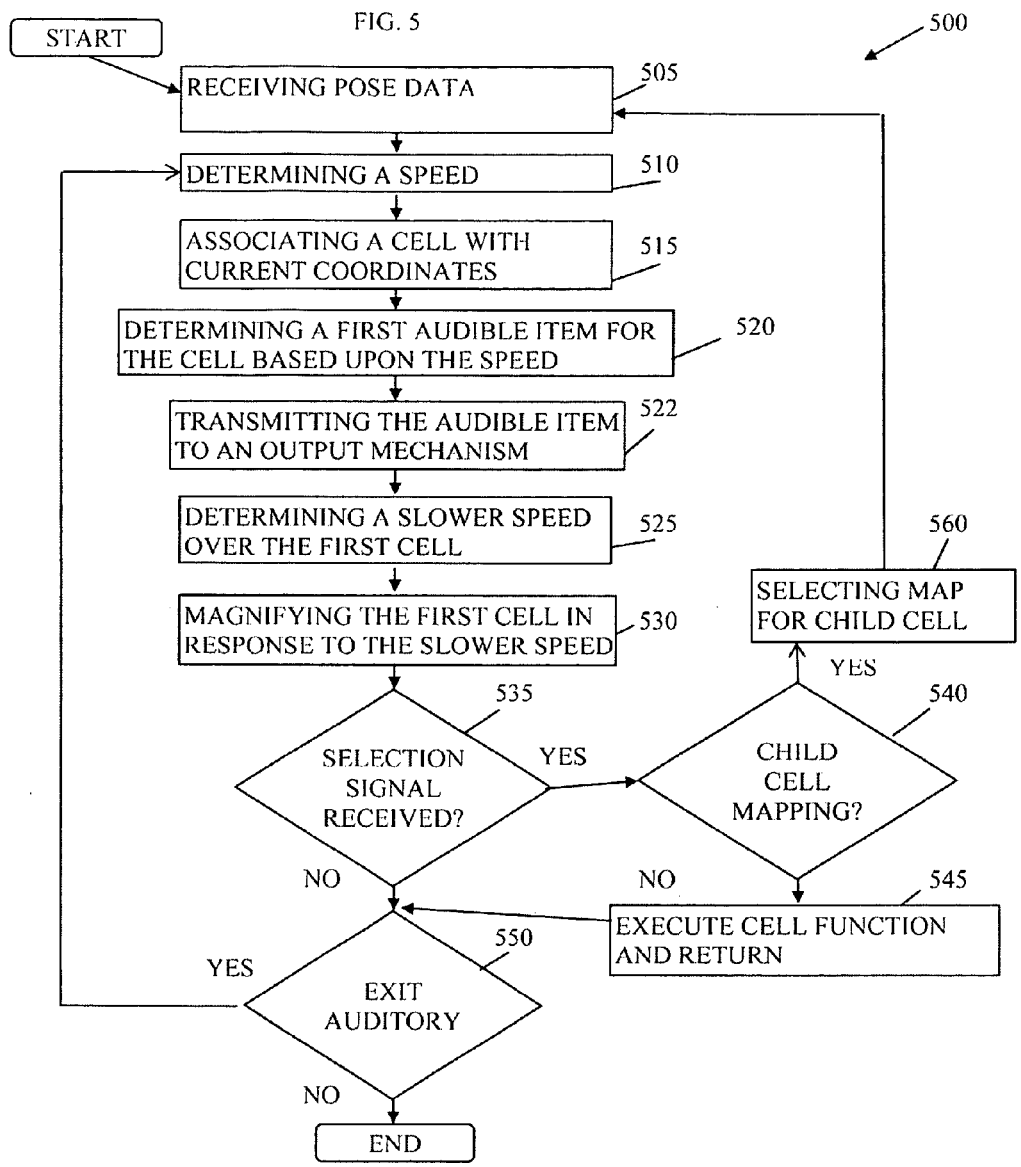

POSE TO DEVICE MAPPING

FIELD

The present disclosure relates generally to user interface technologies. More particularly, the present disclosure relates to pose mapping.

BACKGROUND

A mobile device such as a cellular phone, handheld device, handheld computer, "Palmtop", Mobile Internet Devices (MIDs) or the like is typically a pocket-sized computing device having a user interface such as a display screen with touch input or a miniature or micro keyboard. Many personal digital assistants (PDAs) integrate the inputs and outputs with a touch-screen interface.

Mobile devices such as Smartphones, PDAs, and Enterprise digital assistants (EDAs) are popular tools for those whom require the assistance and convenience of a conventional computer in environments where carrying one would not be practical. EDAs offer functionality for the business user such as integrated data capture devices like Bar Code, Radio Frequency Identification (RFID) and Smart Card readers. As is the case with many PDAs, EDAs may also include a Touch Screen, an Infrared Data Association (IrDA), Bluetooth®, and a Memory card slot.

As mobile devices become more capable in processing, communication and storage, new applications are emerging to take advantage of these capabilities and the inherent mobility of these devices. Mobility, however, imposes several constraints on the types of interaction users of mobile devices can be involved in. It is increasingly common for users to use of the device capabilities (calendar, contacts, location based services, email, . . . ) when a visual interaction is inappropriate. Examples of such situations are situations in which the user is physically active (walking, running, driving); the device is not reachable (e.g.: in the purse or pocket); the screen is too small for a quick interaction; or the user is engaged in demanding activities or at least visually demanding activities.

Due to the form factor constraints, the user interface has become the main limiter on practical usage of mobile devices. For instance, having a full size keyboard and display are clearly not a practical option for use with mobile devices. In lieu of a full size keyboard, many mobile devices incorporate micro keyboards, key pads, or a unique combination of keys and buttons, which are less than ideal and are not conducive with multi-tasking.

BRIEF DESCRIPTION OF THE DRAWINGS

FIG. 1G depicts an embodiment of mobile device functions mapped to wrist/elbow pose positions for a system including a mobile device, a watch, and an earpiece;

FIG. 5 illustrates a flow chart of an embodiment for traversing cells via audible mapping.

DETAILED DESCRIPTION OF EMBODIMENTS

Figure 1A:
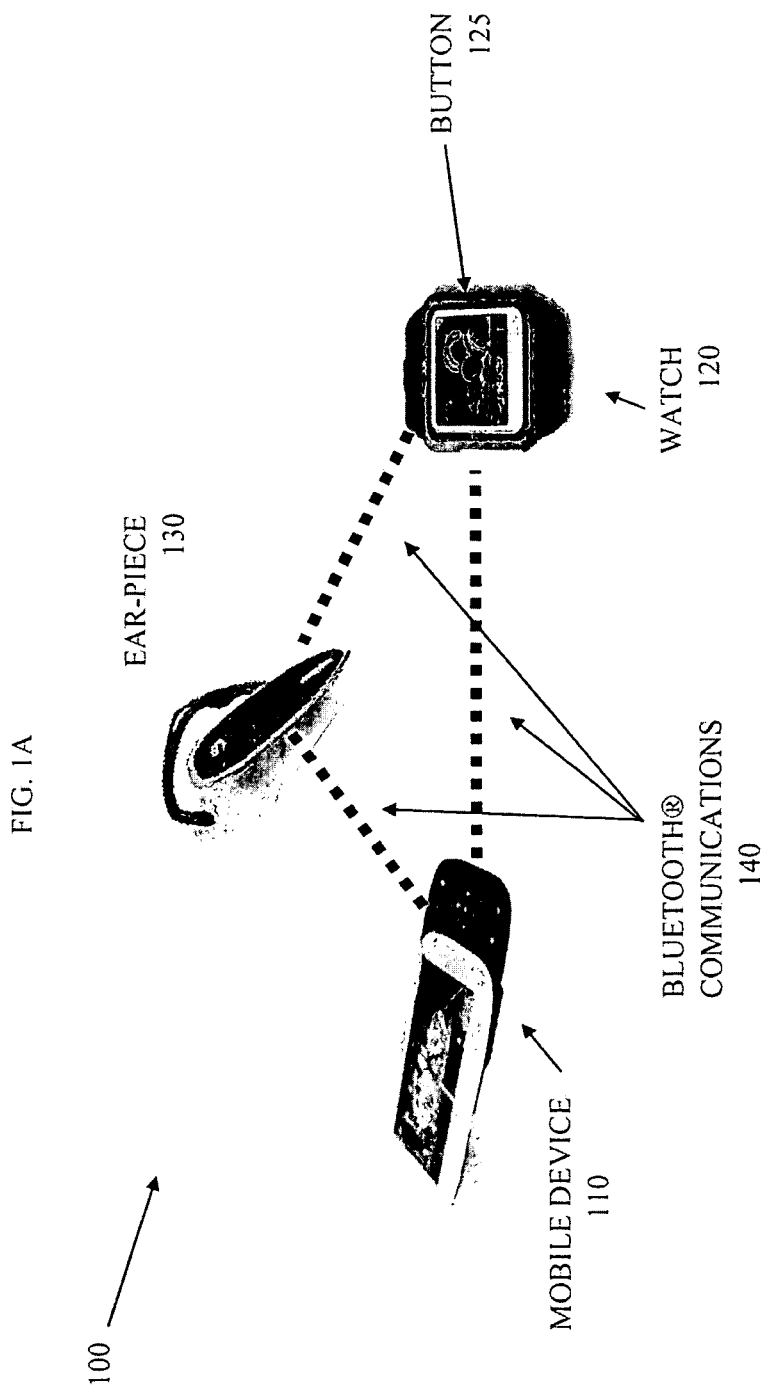
FIG. 1A depicts an embodiment of a system including a mobile device, a watch, and an earpiece.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, pose mapping is described herein. Embodiments may comprise logic such as hardware and/or code to map content of a device such as a mobile device, a laptop, a desktop, or a server, to a two dimensional field or table and map user gestures or movements to the coordinates within the table to offer quick access to the content by a user. Many embodiments, for example, utilize three wireless peripherals such as a watch, ring, and headset connected to a mobile Internet device (MID) comprising an audible user interface and an auditory mapper to access device features. Other embodiments use a visual user interface and visual mapper for use with, e.g., a display. The audible user interface may communicatively couple with the peripherals to receive pose data that describes the motion or movements associated with one or more of the peripherals and to provide feedback such as audible items and, in some embodiments, other feedback. In several embodiments, the content includes applications such as recording a quick grocery list items, changing an instant messaging cloud image from 'available' to 'do not disturb', calling from a contact list, setting a location based alarm, changing their MP3 volume control, dropping a location or RF waypoint, selecting a MP3 playlist, checking next meeting time, hearing pedestrian navigation directions, answering/dispensing a phone call, reading e-mail or traffic reports, recording a person's name, composing the MID with environment, and of course hearing the time-of-day.

Embodiments may facilitate wireless communications. Wireless embodiments may integrate low power wireless communications like Bluetooth®, wireless local area networks (WLANs), wireless metropolitan area networks (WMANs), wireless personal area networks (WPAN), cellular networks, and/or Institute of Electrical and Electronic Engineers (IEEE) standard 802.15.4, "Wireless Medium Access Control (MAC) and Physical Layer (PHY) Specifications for Low Rate Wireless Personal Area Networks (LR-WPANs)" (2006) (http://standards.ieee.org/getieee802/download/802.15.4-2006.pdf), communications in the mobile device, watch, earpiece, and ring to facilitate interaction between such devices.

Furthermore, some wireless embodiments may incorporate a single antenna while other embodiments may employ multiple antennas. For instance, multiple-input and multiple-output (MIMO) is the use of multiple antennas at both the transmitter and receiver to improve communication performance. MIMO technology offers significant increases in data throughput and link range without additional bandwidth or transmit power. It achieves this by higher spectral efficiency (more bits per second per hertz of bandwidth) and link reliability or diversity (reduced fading).

Other embodiments may implement some or all communications via physical media that interconnects two or more devices such as the mobile device, watch, earpiece, and the ring. In some of these embodiments, the physical media interconnecting such devices may be integrated with clothing.

While some of the specific embodiments described below will reference the embodiments with specific configurations and are described in conjunction with auditory mapping, those of skill in the art will realize that embodiments of the present disclosure may advantageously be implemented with other configurations with similar issues or problems including visual mapping. In particular, embodiments can include a visual mapper to map items visually rather than aurally or in addition to aurally.

Turning now to FIG. 1A, there is shown an embodiment of a system 100. System 100 comprises a mobile device 110, a watch 120 with a button 125, and an earpiece 130. The mobile device 110 in this embodiment is a mobile Internet device (MID) and cellular phone. The mobile device 110 may contain, or provide access to, a menu or list through which a user will traverse. For instance, the cellular phone may comprise functions for recording a quick grocery list items, changing their cloud image from 'available' to 'do not disturb', calling from contact list, setting a location based alarm, changing their MP3 volume control, dropping a location or RF waypoint, selecting a playlist, checking next meeting details, hearing pedestrian navigation directions, answering/dispensing a phone call, reading e-mail or traffic reports, recording a person's name, composing the MID with environment, and of course hearing the time-of-day . . . . Access to the system settings or preferences, text messages, etc., may also be accessible in a menu or sub-menu format. Furthermore, the cellular phone 110 may have access to the Internet or other wireless networks, allowing the user to access a number of remote services through menus or lists.

The mobile device 110 may comprise or have access to content via an auditory mapping and/or a visual mapping on, e.g., a display and, in the present embodiment, the user may interact with the mobile device 110 remotely, allowing the mobile device 110 to remain in the pocket, purse, or bag. Remote communication may be accomplished via wireless communication formats. Wireless embodiments may integrate low power wireless communications 140 like Bluetooth® and/or Institute of Electrical and Electronic Engineers (IEEE) standard 802.15.4 communications in the mobile device, watch, earpiece, and ring. The standard, IEEE 802.15.4™, provides for low-data-rate connectivity among relatively simple devices that consume minimal power and typically connect at distances of 10 meters (30 feet) or less. IEEE 802.15.4™, addresses fixed, portable and moving devices that operate at data rates of 10 to 250 kbps.

In many embodiments, the content may be in an audible format via a library of audible items including an audible icon per item and, in several embodiments, a longer, more explanatory audible item such as a text-to-speech conversion of a name of the item. Similarly, content may be in a visual content with graphic icons for each item and possibly a longer description or more detailed graphic. In one embodiment, the content may comprise text and the mobile device 110 may translate the items into one or more longer audible items via, e.g., text-to-speech conversion logic, or the like. For example, the menu item for calling from the contact list may be associated with two audible items, one being an audible icon that sounds like a telephone ringing and the other being a text-to-speech conversion of the phrase "Call from Contact list".

Figure 1B:
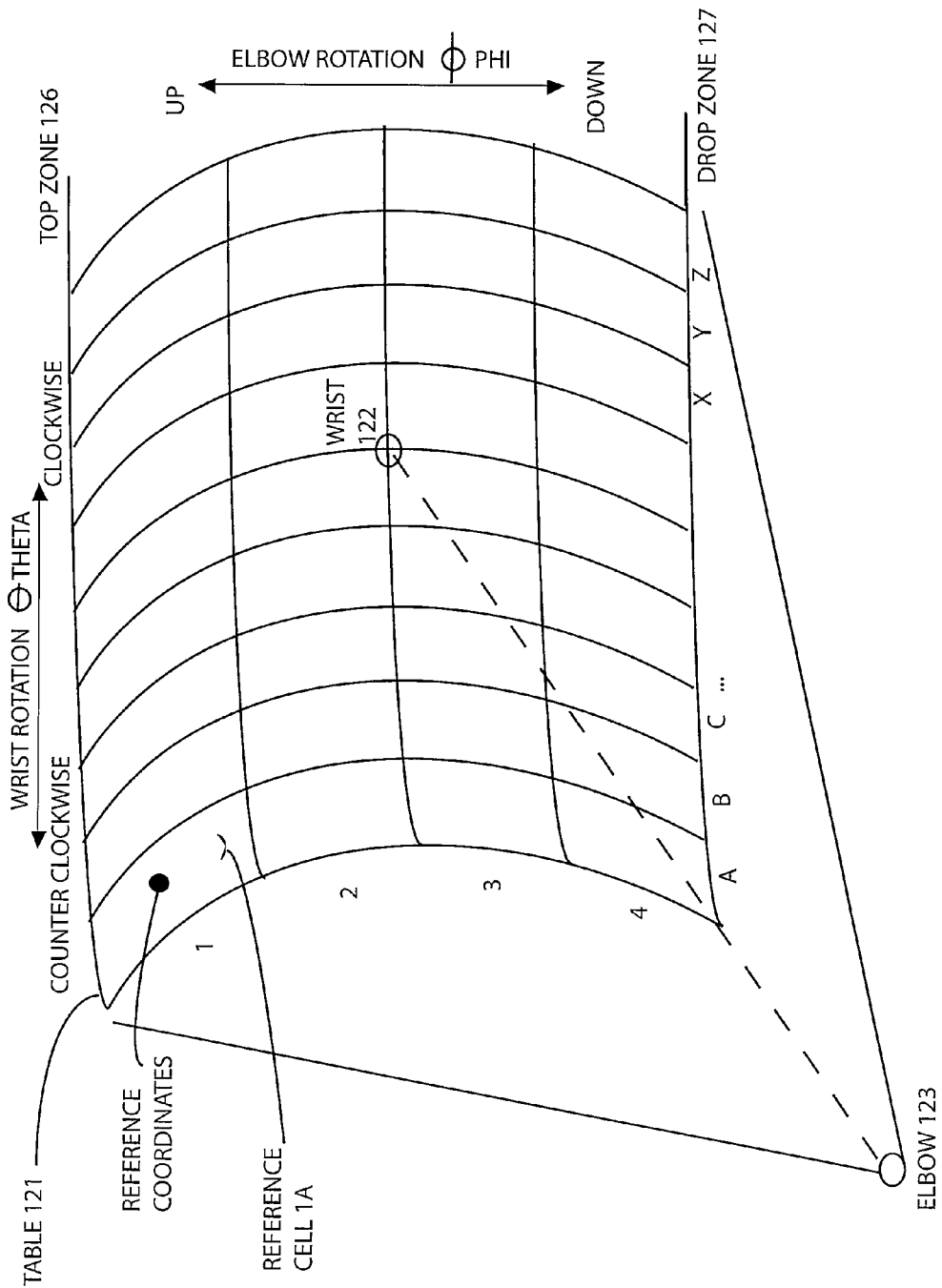
FIG. 1B depicts an embodiment of pose-to-auditory mapping of cells to wrist and elbow positions.

Referring now to FIGS. 1A and 1B, the audible format or visual format of the content may be mapped to a cells in a table 121. Each cell may have a location denoted by the row such as rows 1 through 4 and a column such as columns A through Z. Cell 1A, for instance, is the referred to as the reference cell and comprises the reference coordinates. In the present embodiment, each item of the content is mapped to coordinates at the center of a cell and the height and width of the cell is the range within which a user may select the cell. For example, the main menu system for the mobile device may include the functionality for calling from the contact list and this function may be mapped, at least initially, to the reference coordinates. Thus, if the user maneuvers to the reference cell 1A, by changing to the corresponding pose, the user may initiate the calling from the contact list function.

The watch 120 may measure physical movement by a user to provide the mobile device 110 with information related traversal of the table 121. In the present embodiment, the watch 120 comprises a built-in three-dimensional (3-D) accelerometer to monitor an amount of tilt or rotation of the user's wrist 122 and the angle of rotation of the user's elbow 123. In other embodiments, the watch 120 may comprise one or more two-dimensional (2-D) accelerometers and/or one or more tilt sensors or switches or a gyroscopic sensor. Furthermore, the watch 120 may comprise a battery that vibrates upon receipt of instructions from the mobile device 110 to give the user some feedback related to logical boundaries and/or pose boundaries as such boundaries are approached or crossed such as the boundaries of the table 121. In other embodiments, the watch 120 may comprise a wrist band or bracelet without traditional time piece functionality.

To illustrate, the user may access lettered cells in the table 121 along rows 1 through 4 by rotating the wrist 122 along the axis of the forearm defined by elbow 123 and wrist 122) and, thus, the watch 120, clockwise or counter-clockwise and may access numbered cells in the table 121 along columns by locating the wrist 122 above or below the elbow 123 up and down. In fact, the cells of table 121 are mapped the same, each time the user accesses this menu. Thus, the functionality for calling from the contact list is mapped to cell 1A at the reference coordinates each time the user accesses this menu so the user may directly access the functionality for calling from the contact list by memory of the cell's location in terms of the angle of the user's wrist and elbow and by moving to that same position upon entering the menu mapped on table 121. In several embodiments, the user may modify or customize mappings of content such as the main menu for mobile device 110 by, e.g., adding/deleting a function, rearranging cells, changing the size of the cells, or the like, which may modify the position for cell 1A or the location of the functionality for calling from the contact list.

In the present embodiment, due to the measurements of angles (theta $\theta$ and phi $\phi$) of rotation of the user's wrist 122 and elbow 123 (or angular movements) to access the cells of the table 121, the table 121 is a mapping on a surface of a sphere, wherein the elbow 123 is the center of the sphere, columns A through Z represent a range of rotation (theta $\theta$)

of the wrist 122 and rows 1 through 4 represent a range of rotation (phi ϕ) of the elbow 123. Thus, in the present embodiment, distances may be measured in terms of latitudinal degrees (theta θ) and longitudinal degrees (phi ϕ) and speed may be measured in the change in degrees (delta phi ϕ and/or delta theta θ) over the change in time. In many embodiments, the range of rotation utilized for the wrist 122 and for the elbow 123 are preferences that a user may customize. In some embodiments, the ranges may be selectable on a per activity basis so the user can restrict or expand the ranges depending upon the activity in which the user is engaged.

In some embodiments, the table 121 comprises a top zone 126 and a drop zone 127. The top zone 126 may represent a location in the table at which the user will go to return to a parent or the previous mapping. If the user is already at the highest-level mapping and/or the mapping is the first mapping accessed, the top zone 126 may do nothing or may exit auditory mapping. The top zone 126 may be located above the highest row of cells. Entering the drop zone 127 may exit auditory mapping. In some embodiments, the top zone 126 and the drop zone 127 may only be available upon entering a cell mapping.

In the present embodiment, the watch 120 also comprises a button 125. The user may depress the button 125 to select or execute the item of interest in the table 121. For instance, upon traversing the table 121 to the item of interest, the user may depress the button 125 on the watch 120 to generate a selection signal to transmit to the mobile device 110. In other embodiments, the user may release the button 125 to select the item of interest. In further embodiments, the button 125 may be a capacitive switch, a heat sensitive switch, or other type of touch-sensitive switch that the user can activate without physically moving or at least noticeably moving the button 125.

Figure 1C:
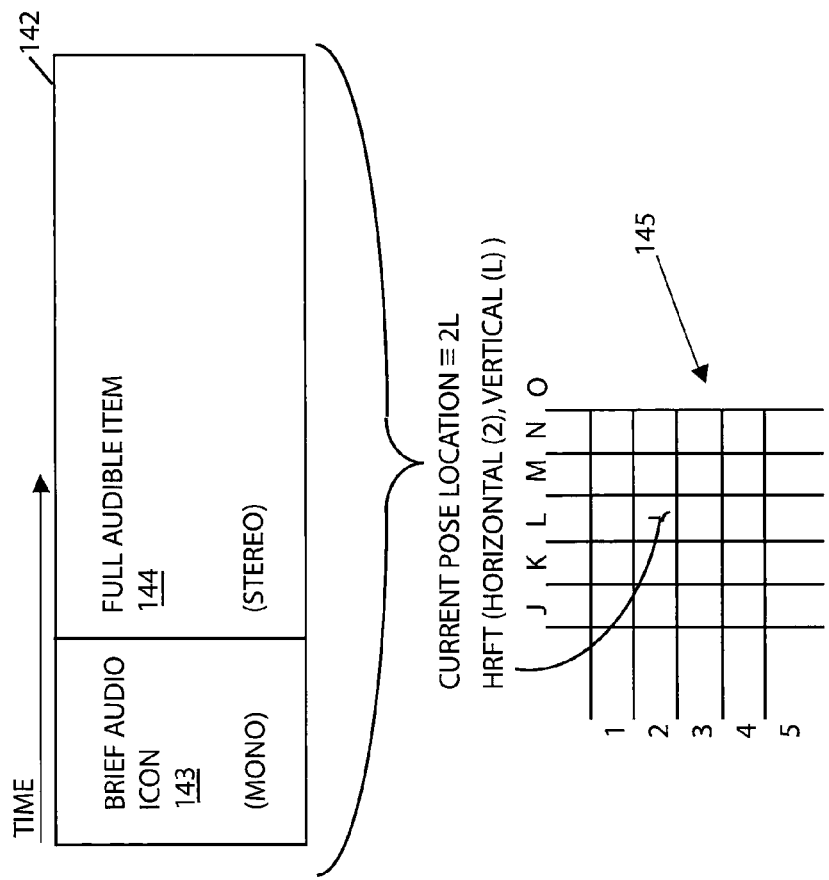
FIG. 1C depicts an embodiment of audible items output in response to hovering over a cell.

The earpiece 130 will play back audible items to the user to help the user maneuver through the table 121 to an item of interest. The user maneuvers by changing to the appropriate pose to reach the item of interest in the table 121 and this can be accomplished by experienced users via muscle memory. Less experienced users or those not as familiar with the content of the mappings may navigate or traverse multiple cells in an attempt to reach the item of interest. Reaching the cell for the item of interest may be the goal in some instances because the earpiece 130 may play an audible item such as a text-to-speech annunciation of the text of the item. In other instances, selecting the item may allow the user to enter into a sub-menu mapping of items. For example, upon reaching cell 2L in table 121 (see the sub-section 145 of table 121 shown in FIG. 1C), audible items 142 for the cell 2L will be output by the mobile device 110 to the earpiece 130. If the user remains in the cell 2L for only a brief time such as less than 30 milliseconds (ms), the brief audio icon 143 will be output to the earpiece 130. If the user remains in cell 2L for a longer period of time, the full audible item 144 may be output by the mobile device 110 to the earpiece 130. In several embodiments, more than two audible items may be associated with cells, each audible item to be output in response to the user remaining in, or hovering over, a cell for certain periods of time. In some embodiments, the audible items may be modified by a transfer function such as a head related transfer function (HRTF) to disperse output audio amongst more than one speakers in a manner that can be perceived by the user as the position of the cell 2L with respect to the current pose location or coordinates. In other embodiments, the HRTF only takes into account the cell associated with the current pose location. In many embodiments, the mobile device 110 may implement audio fading in conjunction with the HRTF as the user traverses multiple cells such that the audible item of the previously traversed cell may be fading to one side, the audible item of the current pose location may be in front of the user, the audible item of the subsequent cell may be increasing in volume to indicate that the user is approaching the cell. In further embodiments, once the user maneuvers to the item of interest, he/she can use the button 125 on the watch 120 to select the item, executing a function related to the item such as entering a sub-list or playing audio content associated with the selected item.

To illustrate, the cell 2L may represent a function for changing the volume of the ringer for the mobile device 110. Arriving at the cell 2L causes mobile device 110 to transmit the brief audio icon 143 to the earpiece 130, which, in response, plays a sound icon representing a ringer at the current volume setting for the mobile device 110. When the user remains on the cell 2L for longer than 30 ms, the mobile device 110 transmits the full audible item 144 to the earpiece 130, which outputs a full text-to-speech conversion of the name of the function, "Ringer Volume Control". The user may enter the ringer volume control function by pressing the button 125, releasing the button 125 or pressing and holding the button 125 (also referred to as 'grabbing' the item in the cell).

Figure 1D:
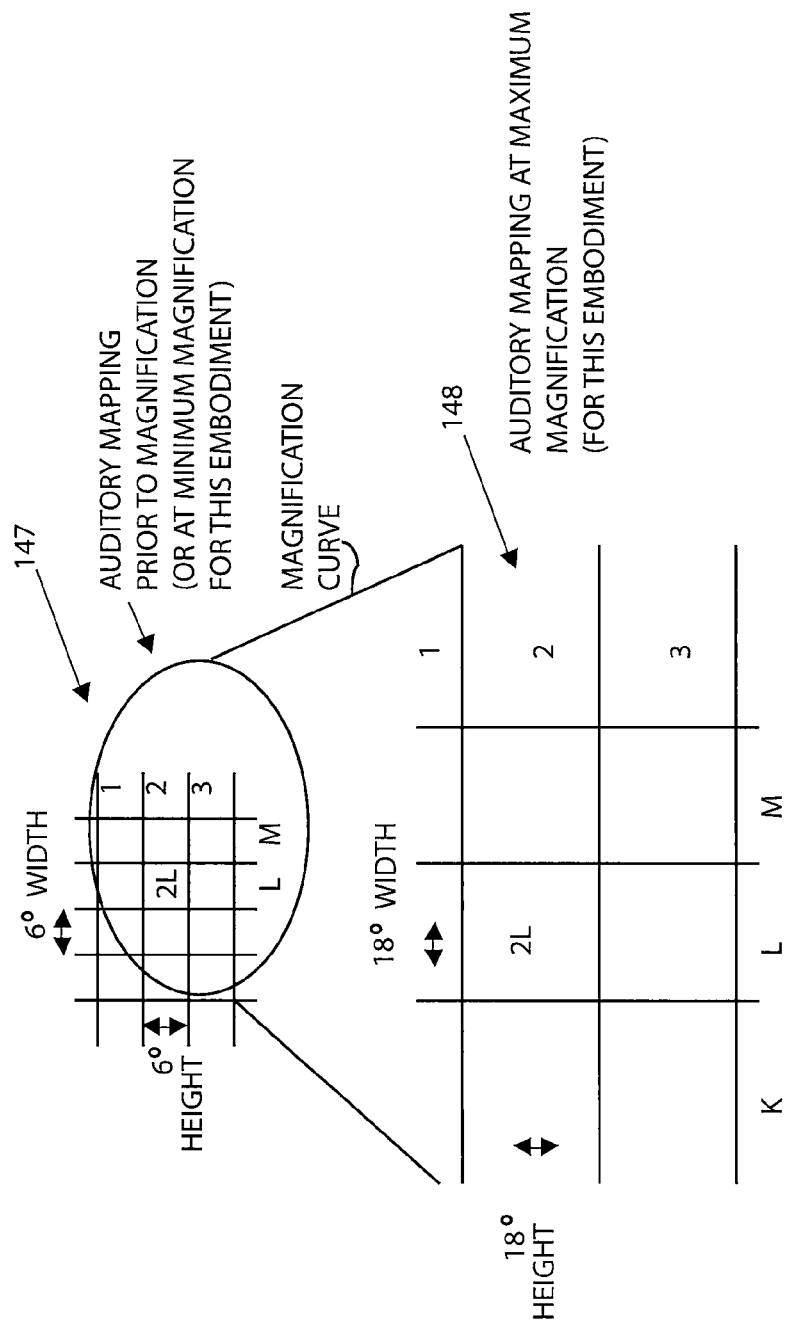
FIG. 1D depicts an embodiment of magnification of cells in proxity the current pose location in response to hovering over one of the cells.

In addition to transmitting the audible items to the earpiece 130 in response to the user remaining in cell 2L for a certain period of time, the mobile device 110 may magnify the mapping to stabilize selection of the cells. FIG. 1D depicts an embodiment of magnification of cells in proximity to the current pose location in response to hovering over one of the cells 2L. Table section 147 illustrates a portion of table 121 with cell 21, and table section 148 depicts the section 147 after the section 147 is magnified. In this example, the cells of table section 147 are 6 degrees wide and 6 degrees high. As the user hovers over cell 2L, the magnification of cell 2L as well the cells near cell 2L are magnified by mobile device 110 to increase their width to 18 degrees and height to 18 degrees, which, in effect, increases the distance that the user must traverse to exit cell 2L. This magnification stabilizes the selection of cells by increasing the cell tolerances for remaining on the cell. In some embodiments, magnification can be adjusted in preferences by the user as a generally applicable setting and, in some embodiments, the magnification can be adjusted in preferences on a per activity basis.

Figure 1E:
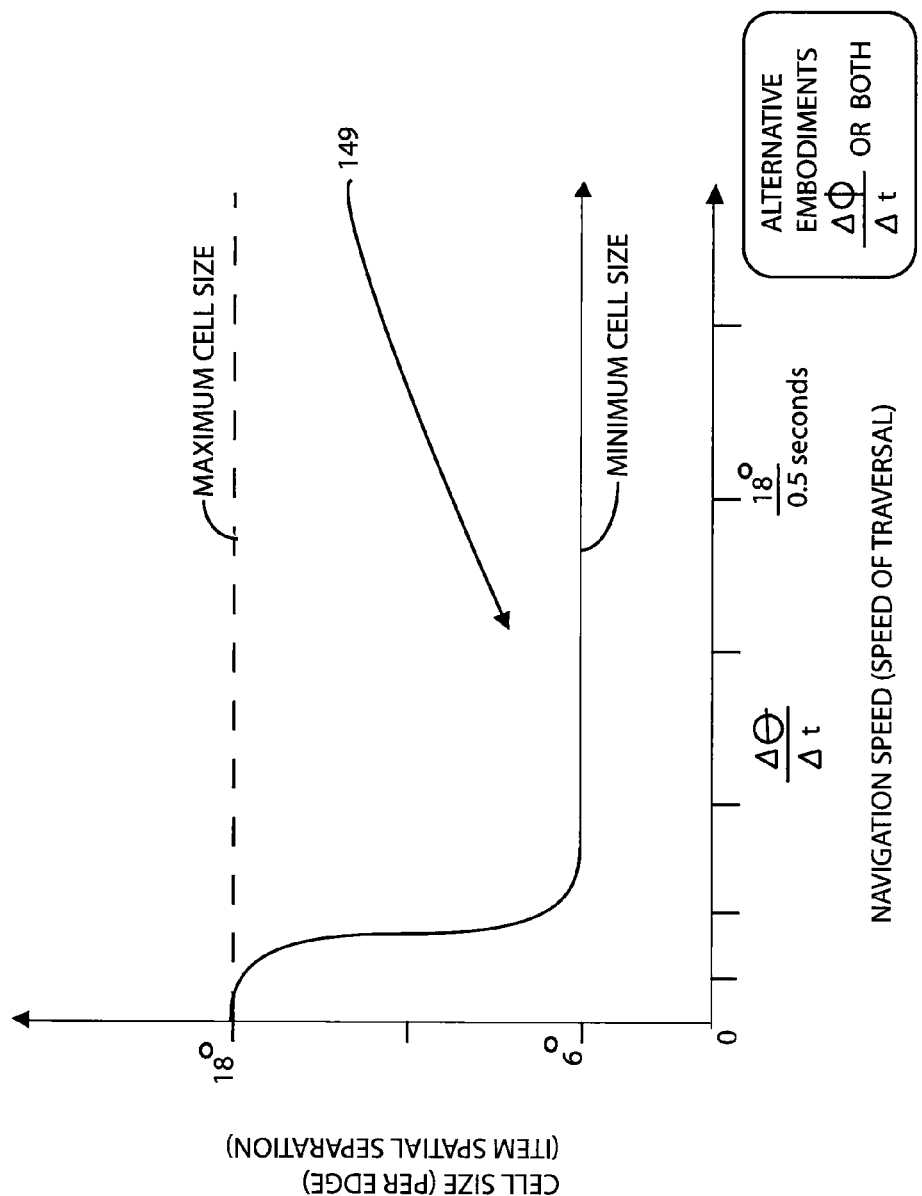
FIG. 1E depicts an embodiment of magnification curve that describes the change in size of a cell based upon the speed with which the user traverses the mapping.

FIG. 1E depicts an embodiment of magnification curve that describes the change in size of a cell based upon the speed with which the user traverses a cell such as cell 2L in the mapping of table 121. In FIG. 1E the magnification, rather than being a specific change in magnification after hovering over a cell for a specified period of time, is magnification based upon a curve 149. The curve 149 depicts the change in the size of the cells in the proximity of the current pose location, i.e. the coordinates over which the user is traversing based upon the speed with which the user is traversing the cell. The curve 149 defines a minimum size for the cells as 6 degrees by x degrees, a maximum size for the cells as 18 degrees by x degrees, and the speed (delta theta over the change in time) determines the actual size of the cells near the current pose location. The x degrees represent phi, which may be large enough in many embodiments that magnification is unnecessary. In other embodiments, the phi component of speed is taken into consideration for determining magnification. In some embodiments, the magnification range may be determined by the number of cells in the mapping, by user preference, or by another curve. In some embodiments, the magnification of column width cell sizes Theta, and the row height Phi are independently calculated and use independent minimum and maximum cell limits.

Figure 1F:
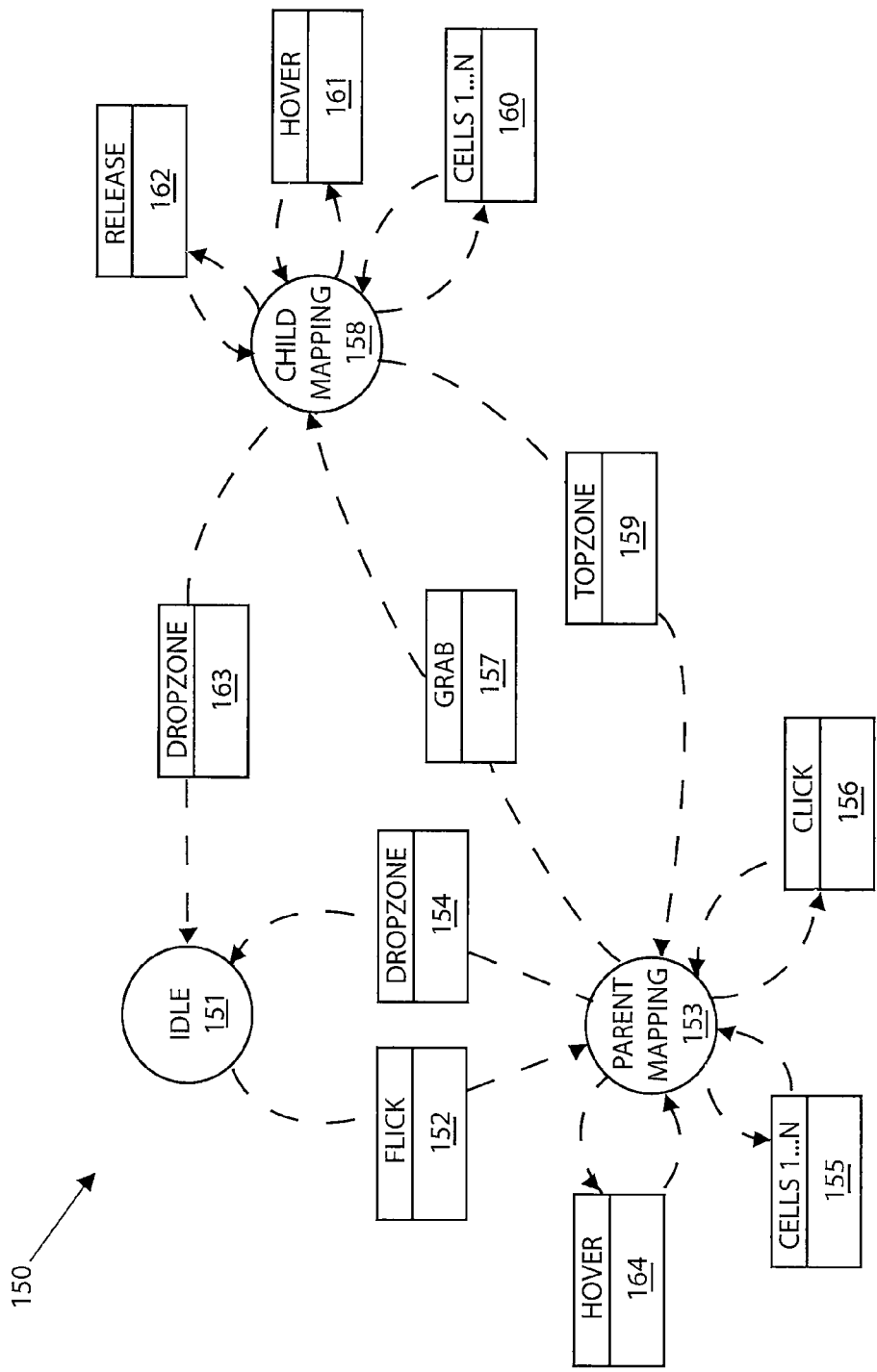
FIG. 1F depicts an embodiment of a state diagram for a system including a mobile device, a watch, and an earpiece.

Referring now to FIGS. 1A, 1B, and 1F, FIG. 1F depicts an embodiment of a state diagram 150 for system 100 including the mobile device 110, the watch 120, and the earpiece 130. System 100 begins at the idle state 151. At the idle state 151, the user has not yet engaged the audible user interface of the mobile device 110 to enter auditory mapping of content of the mobile device 110. The user initiates auditory mapping by a flick 152 of the wrist, moving to the parent mapping state 153. In other embodiments, the user may press the button 125 or perform some other action to move or wake from the idle state 151. In another embodiment, the user may press a button on a ring or otherwise change the state of a switch by touching a ring.

The parent mapping state 153 may be, for instance, the main menu for the mobile device 110 and the main menu items may be mapped to cells in a table such as table 121. In other embodiments, the parent mapping state 153 may be a cell mapping that is one or more levels below the main menu system for mobile device 110. In such embodiments, the cell mapping may resemble the mapping illustrated in FIG. 1G.

From the parent mapping state 153, the user may return to the idle state 151 by remaining idle or rotating the elbow 123 to the drop zone 154. The drop zone 154 may be a location such as drop zone 192 in FIG. 1G such as a rotation of the elbow 123 below a certain angle to indicate a command from the user to exit auditory mapping or return to the idle state 151.

From the parent mapping state 153, the user may also traverse the cells 155 available at the parent mapping state 153, hover over a cell 164 to magnify the cell, "click" a cell 156 by pressing and releasing the button 125 while at the cell to execute the cell's function, or "grab" the cell 157 by pressing and holding the button 125 while the current pose location is at the cell. Traversing the cells 155 at the parent mapping may involve traversing a table of cells such as table 121 or traversing a list of cells as shown in FIG. 1G. Note that FIG. 1G depicts a single row version of table 121 from the perspective of a wrist-to-elbow view.

Executing the cell 156 may, for instance, redial the last number dialed if the cell at the current pose location is a redial function for the mobile device 110. On the other hand, if the function mapped to the cell at the current pose location is a function such as change the volume, clicking the cell 156 may change the auditory mapping to a child mapping state 158.

If the user grabs the cell 157 from the parent mapping state 153, the user may change to the child mapping state 158 while the user continues to press the button 125. At child-mapping state 158, the user may return to the parent mapping state 153 by entering the top zone 159 and releasing the 'grabbed' button, traverse cells 160 as described in conjunction with FIG. 1G or table 121, hover over a cell 161 to magnify the cell, release 162 the button 125 to execute the cell, or traverse to the drop zone 163 and release the button to return to the idle state 151.

Turning to FIGS. 1F and 1G. Upon releasing the button 125, the user may execute the cell's function if the user enters the child mapping state 158 by grabbing the cell. For example, assume that at the parent mapping state 153, the user poses at to a cell including a menu of the user's favorite or most recent activities. The user may grab the cell 157 by pressing and holding the button 125. The user enters the child mapping state 158 and the mapping 190 of this state is depicted in FIG. 1G. While still pressing the button, the user may traverse the menu mapping 190 by positioning the wrist at one of the user wrist rotations shown. If the user, for instance, enters the child mapping state with the wrist rotated so the face of the watch 120 faces upward, which may be the reference location for this mapping, the user may enter the mapping 190 at the TIME cell and may access other cells by rotating the wrist counter-clockwise if the TIME cell is not the cell of interest. At this point, the user may release the button 125 to execute the TIME cell. Execution of the TIME cell may annunciate the time via the earpiece 130 and then return the user to the parent mapping state 153.

On the other hand, if the user enters the child mapping state 190 with the watch facing directly left and the user does so by clicking the cell 156, the user may enter the child mapping state 158 at CALL CONTROL of mapping 190. Entering child mapping state 190 by clicking the cell 156 leaves the user in the child mapping state 190 after execution of a function such as the TIME cell function. The user may then click the cell CALL CONTROL to execute the CALL CONTROL functionality or rotate the wrist clockwise or counter-clockwise to execute another cell.

Alternatively, the user may exit the child-mapping state 158 by traversing to the top zone 191 or the drop zone 192. Posing in the top zone 191 involves positioning the wrist above the elbow up beyond the top zone boundary 193 and returns the user to the parent mapping state 153. Posing into the drop zone 192 involves rotating the elbow down beyond the drop zone boundary 194 and returns the user to the idle state 151. In many embodiments, feedback is provided to the user upon approaching the drop zone 192 and the top zone 191 such as a signal to watch to vibrate or an auditory feedback. In further embodiments, the user presses the button upon posing into the top zone 191 or drop zone 192 to return the user to the idle state 151 or the parent mapping state 153.

Figure 2:
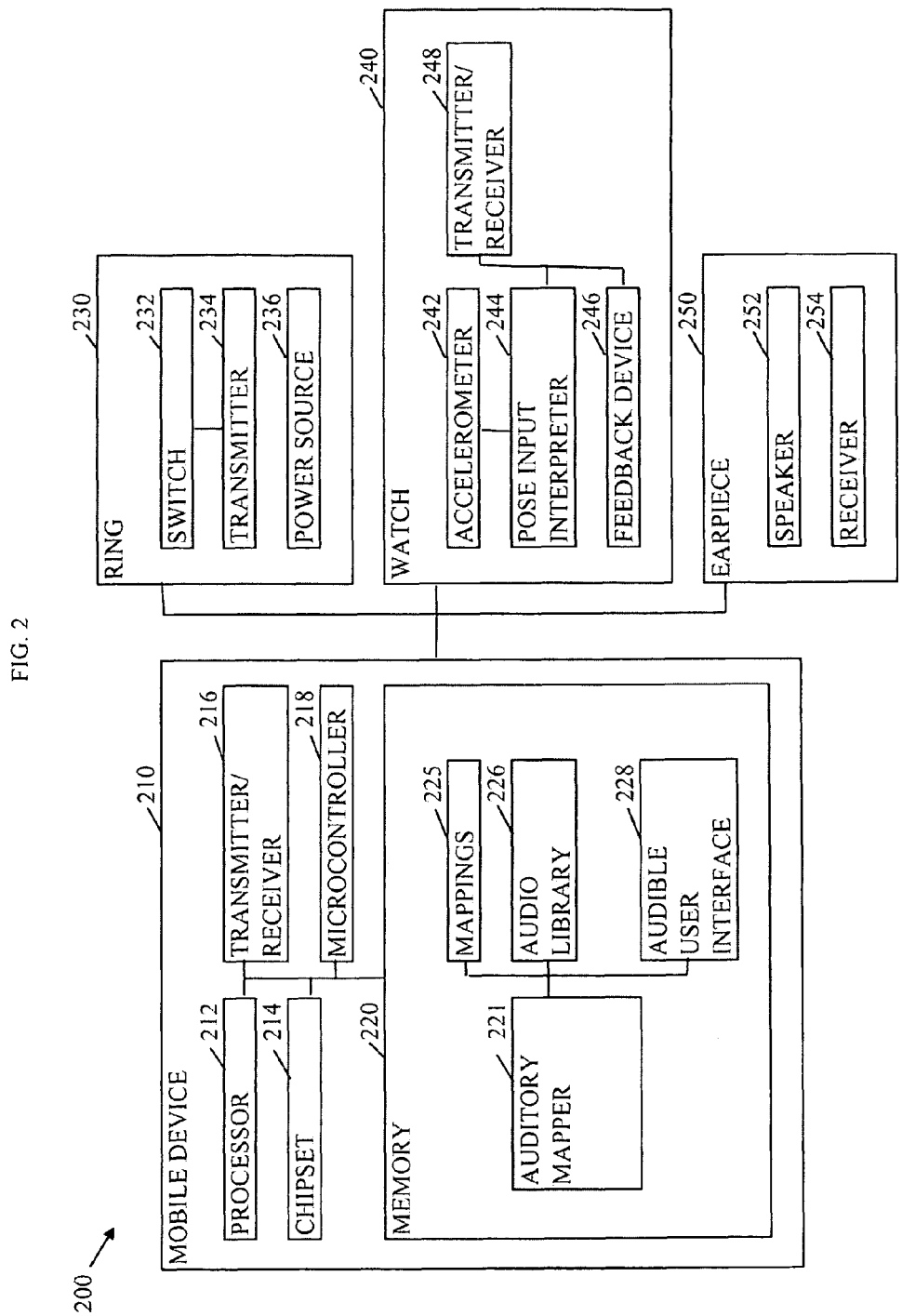
FIG. 2 depicts an embodiment of a system including a mobile device, a watch, a ring, and an earpiece.

FIG. 2 depicts a system 200 to traverse an auditory mappings 225 of a menu, table or list to execute an item mapped to a selected cell such as an application, a function, or access to a child mapping of mappings 225. System 200 may comprise a mobile device 210, a ring 230, a watch 240, and an earpiece 250. The mobile device 210 may comprise a Nettop, a Netbook, a cellular phone, a personal data assistant (PDA), a laptop, MID, or the like. In other embodiments, functionality of system 200 may be integrated into non-mobile or less than mobile devices such as desktop computers, game consoles, servers, and the like.

The mobile device 210 may provide access to one or more menus or lists and may communicatively couple with the watch 240 and the earpiece 250 and with the ring 230 via the watch 240. In some embodiments, the mobile device 210 may also communicatively couple with the ring 230 directly rather than through an interface of the watch 240. For example, the mobile device 210 may comprise navigation code as well as a global positioning system and map data to offer routing information to a user. The mobile device 210 may comprise a mappings 225 of a menu system including functions and destinations in memory 220 and the user may access the mappings 225 in the form of audible items stored in an audio library 226.

The mobile device 210 may comprise a processor 212, a chipset 214, a transmitter/receiver 216, and the memory 220. The processor 212 may receive and execute code such as an auditory mapper 221 via the chipset 214. The processor 212 may comprise, for instance, one or more Intel® Atom™ processors and the chipset 214 may comprise, for instance, an Intel® 945GC Express Chipset or a Mobile Intel® 945GSE Express Chipset.

The chipset 214 may comprise a system controller hub to coordinate communications between the processor 212 and the memory 220, the transmitter/receiver 216, and potentially other devices such as a display, a Peripheral Component Interconnect (PCI) bus, a Universal Serial Bus (USB), a network bus, or the like. For example, the chipset 214 may receive communications from the watch 240 including data from an accelerometer 242 via a pose input interpreter 244 and the transmitter/receiver 248. The chipset 214 may also transmit communications from processor 212 to the watch 240 and the earpiece 250.

In the present embodiment, the chipset 214 may retrieve instructions and data from memory 220 in response to requests from the processor 212 to execute the auditory mapper 221. The instructions and data may comprise logic to interpret accelerometer data from accelerometer 242 and data regarding the state of switch 232. The instructions and data may also comprise logic to select audible items from the audio library 226 based upon the cell associated with the current pose location of the user in mappings 225 to transmit to the earpiece 250 to sound the audible items via a speaker 252. For example, the auditory mapper 221 may facilitate maneuvering by a user through an audio mapping of a main system menu for mobile device 210. The auditory mapper 221 may comprise instructions, which, when executed by the processor 212, cause the processor to select from a number of audio items such as sound clips in the audio library 226 to transmit to the earpiece 250 to indicate the item associated with the cell at current pose location, i.e., the coordinates associated with the position and rotation of the watch 240.

The auditory mapper 221 may also select from a number of different audio items for different positions within the mappings 225 based upon the speed at which the user indicates to traverse the list. For example, as the user reduces the speed while within a cell, the auditory mapper 221 may select an audible item to represent the cell aurally that is longer in duration than the audible item that would be selected at a faster speed. In many embodiments, the auditory mapper 221 may transmit a short audible item and then, if the user remains over the cell beyond a threshold time period such as 100 ms, transmit a longer audible item.

The transmitter/receiver 216 may comprise a wireless communications circuit for communicating with the watch 240 and the earpiece 250. In the present embodiment, the mobile device 210 receives communications from the ring 230 via the transmitter 234 and the transmitter/receiver 248 of the watch 240 to minimize the distance of the transmission to conserve power expended by transmitter 234. In other embodiments, transmitter 234 may be coupled with the watch 240 via a physical communications medium or may couple with transmitter/receiver 216 directly via a wireless or wired communications medium. Wired interconnections may be integrated into wearable items such as a shirt or jacket, for instance.

The transmitter/receiver 216 may also communicate with other devices that are not shown such as a wireless router to provide access for mobile device 210 to other local area networks, wide area networks, or the like. In one embodiment, for instance, transmitter/receiver 216 may comprise an Ethernet adapter to couple with an Ethernet network and a USB adapter to couple with a computer system, an external storage device, a peripheral, or other such devices.

The memory 220 may store code and data for execution by the processor 212, one or more lists such as list 224, as well as audible items in the audio library 226. The memory 220 may comprise one or more different types of data storage including random access memory, read only memory, flash memory, a magnetic storage medium such as a hard drive, an optical storage medium such as a compact disk drive, a digital video disk medium, or the like. The memory 220 may be dispersed throughout the mobile device 210 based upon the design of the mobile device 210 and various efficiencies related to locating memory in different areas of mobile device 210. For example, portions of memory that include auditory mapper 221, mappings 225, audio library 226, audible user interface 228 or any combination thereof may reside in memory located physically close to microcontroller 218 reduce latencies involved with provision of auditory feedback related to traversing and hovering over cells of the mappings 225.

In the present embodiment, the memory 220 comprises at least the auditory mapper 221, the mappings 225, and the audio library 226. The auditory mapper 221 provides a user interface for accessing menus, sub-menus, tables, sub-tables, lists, sub-lists and the like in the form of auditory mappings such as the mappings 225. The auditory mapper 221 may be initiated upon powering up the mobile device 210 or upon selection of the auditory mapper 221 by the user such as by changing the state of switch 232 or pressing a button or initiating a function of watch 240. In some embodiments, the auditory mapper 221 may be initiated upon identification of devices such as the watch 240 or identification of the accelerometer 242 whether or not included within the watch 240.

The auditory mapper 221 may start by selecting a current mapping from mappings 225 and a current pose location within the current mapping. The current pose location relates to coordinates associated with the position of the watch 240. In other words, in the present embodiment, the auditory mapper 221 employs absolute coordinates such that the same position of the watch 240 in terms of tilt and rotation provides the same coordinates regardless of the state of the auditory mapper 221. Other embodiments may employ relative coordinates that place the current pose location, e.g., at the same initial location at the time the auditory mapper 221 is initiated. Further embodiments may initiate auditory mapper 221 at the last visited cell or a preferred starting cell.

The auditory mapper 221 current item may be identified by determining the current mapping, associating the current pose location with the current cell at the location via the mappings 225, and then by identifying the item as being associated with the current cell. The auditory mapper 221 may determine the current mapping of mappings 225 by determining the a default mapping, determining a preferred initial mapping as indicated by user preferences, determining the last mapping accessed, providing the user with a mapping of cells including the most recently accessed cells, or the like.

The user may then traverse the mappings 225 by rotating the wrist to rotate the watch and/or by rotating the elbow to tilt the watch 240. While traversing the mappings 225, the auditory mapper 221 may generate audible items indicative the speed of traversal of the cells in the mappings as well as adjust the magnification of cells being traversed in a mapping based upon the speed. The auditory mapper 221 may generate the audible items by selecting audible items that are associated with cells being traversed from the audio library 226 and transmitting the audible items to the earpiece 250 to sound the audible items in the user's ear(s).

Rotating the watch 240 counter-clockwise and tilting the watch 240 up, for instance, may produce accelerometer data from accelerometer 242. The pose input interpreter 244 of watch 240 may determine that the rotation and tilt represents a change in pose based upon the granularity of the pose input interpreter 244. In some embodiments, this granularity may be a preference set by the user via a user interface of the watch 240 or by the audible user interface 228 of the mobile device 210. For example, the pose input interpreter 244 may receive raw data from the accelerometer 242 and wait until the watch 240 is rotated and/or tilted by a specified magnitude or threshold in any particular direction (such as a certain number of degrees) prior to determining that the user has indicated a change in the pose state for maneuvering through the mappings 225. Upon reaching the threshold, the pose input interpreter 244 may transmit pose data to the mobile device 210 via transmitter/receiver 248 that is indicative of the change in the rotation and tilt of the watch 240. The threshold may be set by code in the watch 240, may be set by the mobile device 210, may be the smallest amount of change determinable by (i.e., the granularity of) the accelerometer 242, or may be the minimum amount of change that can be monitored by (i.e., the granularity of) the pose input interpreter 244.

The auditory mapper 221 may receive the pose data from the watch 240 and determine the new current pose location, determine whether the rotation and tilt of the watch 240 locates the current pose location in another cell, and determine the speed. If the new current pose location is associated with a new cell, the auditory mapper 221 may transmit an audible item such as an audio icon associated with the new cell to the earpiece 250 to provide feedback related to the new cell. The earpiece 250 may output the audio icon via speaker 252. If the new current pose location is associated with the same cell, the auditory mapper 221 may determine that the user is hovering over the cell based upon the speed and transmit another, auditory item associated the current cell. Some embodiments may also magnify the cell based upon the speed.

In some embodiments, any change indicated by the pose input interpreter 244 represents a change in at least the speed and coordinates of the current pose location and is transmitted to the auditory mapper 221. In further embodiments, the granularity of the pose input interpreter 244 is smaller than the threshold of rotation or tilt at which the auditory mapper 221 will change the speed or current traversal coordinates. For example, the user may tilt the watch 240 by 0.5 degrees to the left. The pose input interpreter 244 may determine that the change in tilt surpasses the threshold to transmit the pose data to the mobile device 210 and thus, generates the pose data and transmits the pose data to the mobile device 210. However, the auditory mapper 221 may not implement a movement of less than 1 degree so the current pose location may remain unchanged.

In some embodiments, the auditory mapper 221 may generate a feedback signal in response to the change indicated by the pose input interpreter 244 that represents that cause the current pose location to approach is a top zone or drop zone. The top zone may be a position at which the auditory mapper 221 exits the current mapping to return to a previous mapping or a parent mapping of mappings 225. The drop zone may be a position at which the auditory mapper 221 exits the current mapping to return to the main system menu or the initial menu at start up of the auditory mapper 221 such as the "home" mapping of mappings 225, or exits the auditory mapping 221. In response, the auditory mapper 221 may transmit the feedback signal to a feedback device 246 of watch 240. For example, the feedback device 246 may generate vibrations at a rate indicated by the feedback signal and the auditory mapper 221 may generate feedback signals that increase the frequency of the vibration by the feedback device 246 as the tilt of the watch 240 approaches the top zone or the drop zone. In some embodiments, the auditory mapper 221 decreases the vibration in frequency as the user traverses away from the top zone or the drop zone. In other embodiments, the feedback device 246 may be located in another element other than the watch 240. The feedback device 246 may provide an indication to the user that a change in the current cell has occurred.

The auditory mapper 221 may also select an item in the list upon receipt of a selection signal from a switch 232 of the ring 230. For instance, as the auditory mapper 221 generates audible items by transmitting the audible items to the earpiece 250 to be sounded, the user may press a button on the ring 230 to indicate selection of the item associated with the current cell.

The mappings 225 may comprise any data or information that may be mapped to cells such as table 121 in FIG. 1B or traversed sequentially as described in conjunction with FIG. 1G. For example, the mappings 225 may comprise a mapping for a table of songs, radio stations, phone numbers, contacts, web sites, etc. The mappings 225 may also comprise mappings of functions that the mobile device 210 such as opening contacts, opening text messages, opening email, opening a web browser, entering a menu of preferences, or the like. In the present embodiment, the mappings 225 may comprise items and each item in the mappings 225 may be associated with one or more audible items in the audio library 226. For example, if mappings 225 comprises a menu from which the user may choose different functions of the mobile device 210, each menu item may be associated with a unique audible item such as a sound clip. In further embodiments, the auditory mapper 221 may comprise text-to-speech conversion logic so that audible items may be generated for text items mapped in mappings 221 and stored in audio library 226.

The ring 230 may offer a convenient and intuitive way to "grab" the item in the mappings 225 to select or execute that item. For instance, a button may be located at the bottom of the ring 230 and upon reaching an item of interest in the mappings 225, the user may touch the button with the user's thumb to activate the switch 232, offering the user a natural movement typically related to grabbing an object. In other embodiments, the switch 232 may be located on a different device such as earpiece 250 that is communicatively coupled with the mobile device 210.

The ring 230 may also comprise wireless communications capabilities via transmitter 234 such as a Bluetooth® transmitter. The ring 230 may maintain the switch 232 in a convenient location for a user to activate or actuate the switch 232. In the present embodiment, the ring 230 is wirelessly connected with the watch 240. Upon changing the state of the switch 232, the transmitter 234 may transmit the selection signal to the watch 240 and the watch 240 may transmit the selection signal to the mobile device 210. In the present embodiment, the ring 230 comprises a power source 236 such as a lithium ion battery or other power storage device to power the transmitter 234.

The watch 240 may offer any of a variety of watch functions. In the present embodiment, the watch 240 comprises the accelerometer 242, the pose input interpreter 244 the feedback device 246, and the transmitter/receiver 248. In the present embodiment, the watch 240 transmits raw 3-D accelerometer data to the mobile device 210. In some embodiments, the watch 240 comprises the pose input interpreter 244 to process the accelerometer data to produce pose data prior to transmitting the pose data to the mobile device 210. In other embodiments, the watch 240 may comprise a motion sensor such as one or more tilt switches, a gyroscopic sensor, a 3-D accelerometer, or other sensor capable of monitoring the tilt and rotation of the watch 240.

The earpiece 250 may be any type of earpiece or headset that can sound the audible items to the user. The earpiece 250 comprises the speaker 252 and a receiver 254. The speaker 252 producers the sounds and the receiver 254 may receive an audible item and transmit the signal to the speaker 252 in an appropriate format. For example, if the receiver 254 is coupled with the mobile device 210 via a physical medium, the receiver 254 may comprise a pre-amplifier or impedance matching circuitry. In other embodiments, the receiver 254 may comprise a wireless receiver to receive the audible indicators as wireless signals. In further embodiments, the receiver 254 may comprise a digital receiver, either wired or wireless, and may comprise logic to convert the digital signal to an analog signal that may be sounded by the speaker 252.

In another embodiment the auditory feedback can be replaced with a visual display (head mounted display) and the wrist and elbow poses are mapped to specific menu items on the display.

Figure 3:
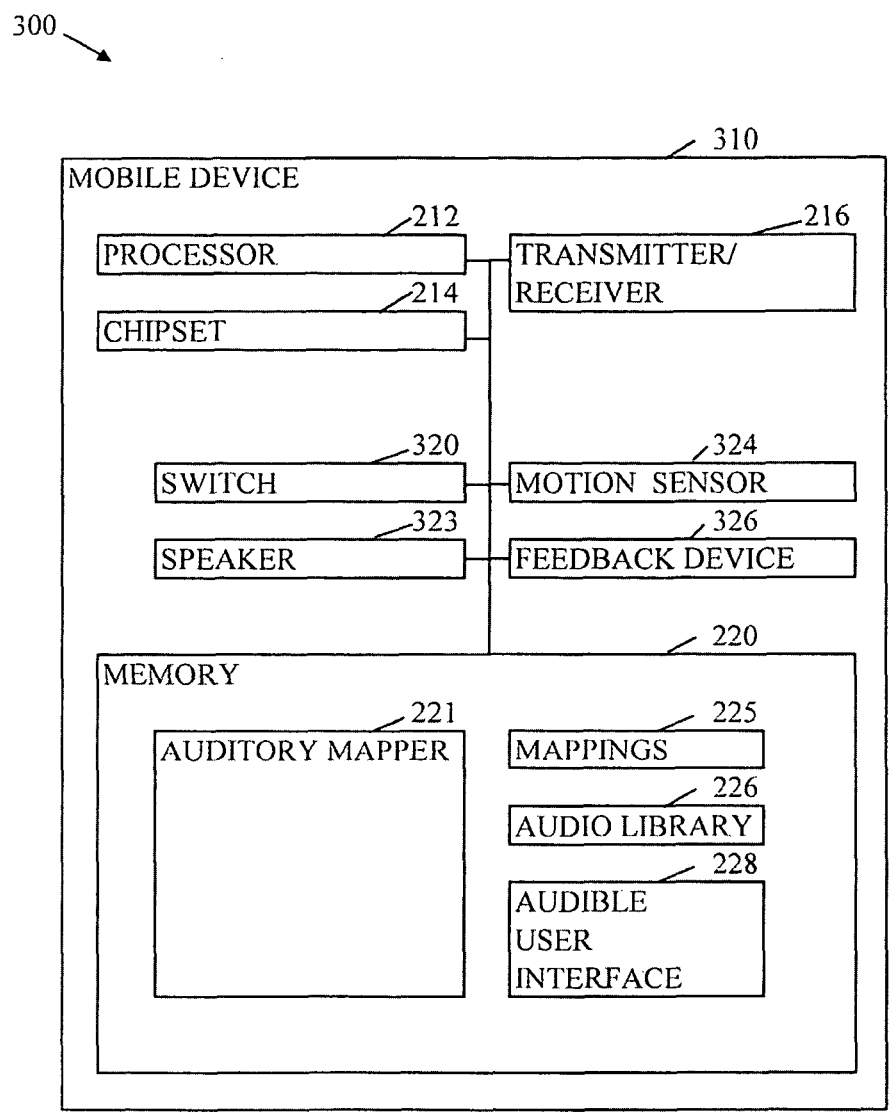
FIG. 3 depicts an alternative embodiment of a mobile device having an accelerometer and a speaker.

Looking now to FIG. 3, there is shown an alternative embodiment 300 of a mobile device 310. Mobile device 310 may be any type of portable device such as a PDA, a cellular phone, a Netbook, a Nettop, or the like. As with mobile device 210 of FIG. 2, mobile device 310 comprises a processor 212, a chipset 214, and a transmitter/receiver 216 and a memory 220 with auditory mapper 221, mappings 225, and audible interface 228 adapted for use with the mobile device 310 so the following discussion focuses primarily on the differences. Mobile device 310 also comprises a switch 320, a speaker 323, a motion sensor 324, and a feedback device 326.

The processor 212, rather than having a microcontroller to relieve processing burdens, may process the code and data for implementing the auditory mapper 225. In some embodiments, processor 212 may employ a priority to processing various functions related to auditory mapper 225 such as provision of feedback of traversal of cells via transmission of audible items associated with the cells.

The switch 320 may provide an indication from the user that the user is selecting an item from the mappings 225. The switch 320 may be a spring-loaded button or a software enabled button utilizing at least a portion of a touch screen on the mobile device 310. In other embodiments, the switch 320 may be voice-activated or otherwise remotely activated.

The speaker 323 may annunciate or sound audible items to inform the user of the cell at the current pose location of mappings 225. In some embodiments, speaker 323 may comprise an audio jack to output the audible items to a headset.

Motion sensor 324 may generate data to describe movement of the mobile device 310 and, in particular, tilt or rotation of the watch 240, e.g., to the left or right and up or down. Motion sensor 324 may comprise a 3-D accelerometer chip or other type of motion sensor and may couple with microcontroller 318 via a bus. In many embodiments, the motion sensor 324 may couple directly with microcontroller 318 via the bus. In many embodiments, rather than integrating an accelerometer into the mobile device 310 to generate the data to describe movement of the mobile device 310, the embodiments may integrate another type of motion sensor such as a gyroscope, a tilt sensor, or a number of tilt switches.

Feedback device 326 may comprise a mechanism for providing feedback to the user in a form other than audio. For instance, the feedback device 326 may comprise a vibration generator on a battery coupled with the mobile device 310. In other embodiments, the feedback device 326 may comprise a visual feedback such as a flashing light, a light emitting diode (LED), or a row of LEDs. For example, as the user increases tilt of the mobile device 310, the auditory mapper 221 may increase the frequency of flashes of the flashing light (which may be a portion of a display of mobile device 310), increase the intensity of light emitted by an LED, increase the number of LEDs lit in the row of LEDs, etc, to indicate either the extent of the tilt within a total range of tilt available for maneuvering the list or to a top zone or drop zone.

Figure 4:
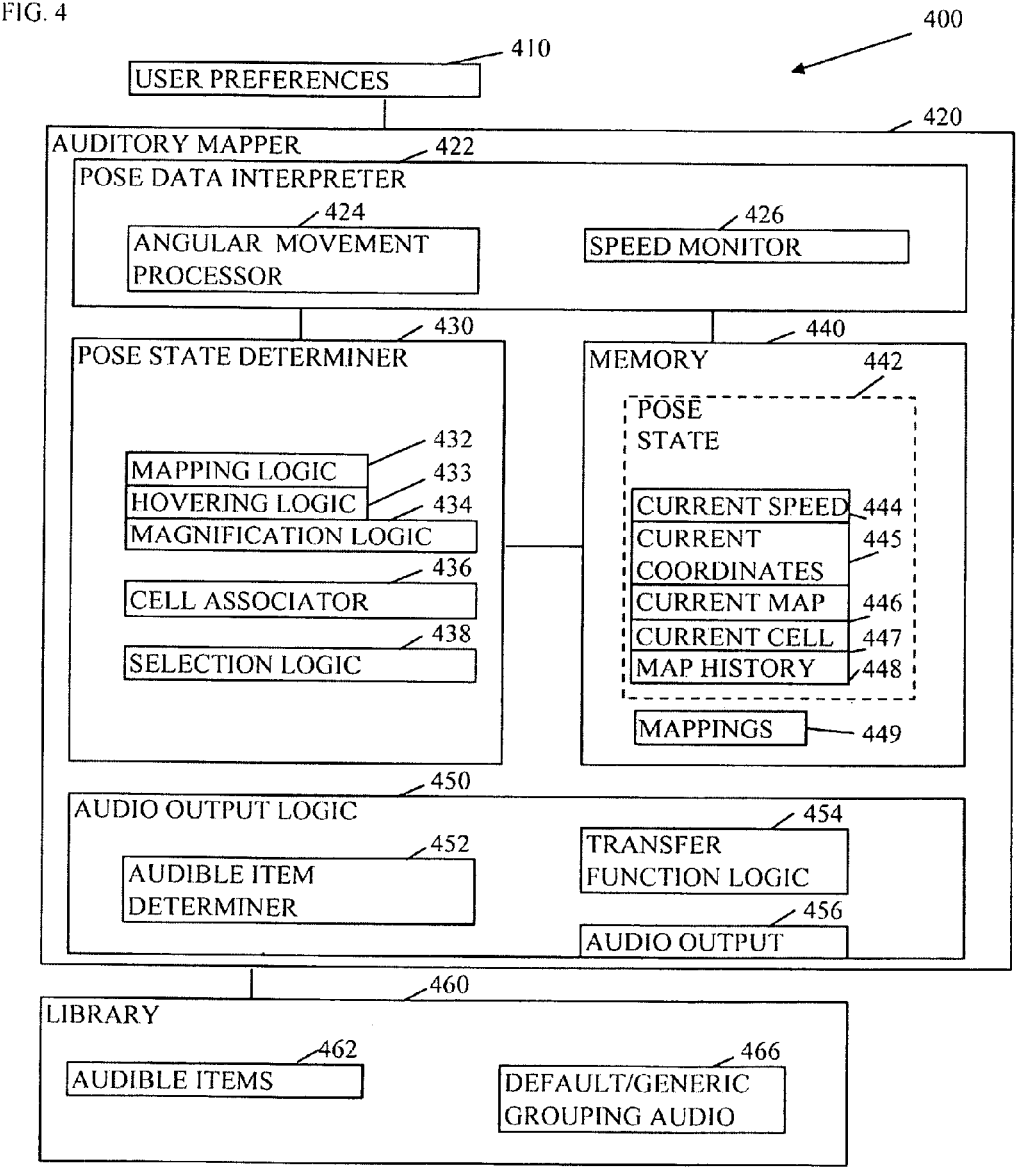
FIG. 4 depicts an embodiment of an apparatus to traverse cells via audible mapping.

FIG. 4 depicts an embodiment of an apparatus 400 to traverse cells via audible mappings 449. The apparatus 400 may comprise a module to couple with a computer such as a server, desktop, notebook, Nettop, or Netbook, to facilitate access to a list via audible mapping. The list may reside either in the device or in storage integrated with or coupled with the computer. The apparatus 400 may connect via an exterior bus or network connection such as a USB connector or an Ethernet adapter. In other embodiments, the apparatus 400 may comprise a module integrated with the computer such as hardware and/or code installed in the computer. For example, the apparatus 400 may comprise a hardware component that can be connected to a mobile device via a USB connector to provide the mobile device with the capabilities to traverse cells of the audible mappings 449.

The apparatus 400 comprises user preferences 410, an auditory mapper 420, and a library 460. The user preferences 410 may comprise preferences related to interpretation of pose data or mapping of pose data onto speeds and directions as well as, e.g., boundaries for top zones and drop zones, boundaries of wrist rotation boundaries of elbow rotation, preferred cell sizes, preferred cell size ranges, preferred magnification methods, or the like. The user preferences 410 may also comprise preferences related to other functionalities of the auditory mapper 420.

The auditory mapper 420 may comprise logic including hardware and code to facilitate traversal of cells of mappings 449. For instance, the auditory mapper 420 may access the library 460 to select audible items 462 that are associated with cells in the mappings 449 and output audible items representative of items in the mappings 449 as those items are traversed.

The auditory mapper 420 may comprise a pose data interpreter 422, a pose state determiner 430, a memory 440, and an audio output logic 450. The pose data interpreter 422 may interpret raw sensor data from a motion sensor that detects movement of a user intended to direct traversal through mappings 449. In many embodiments, the raw sensor data may indicate lateral and longitudinal position such as of a user's wrist, elbow finger, neck, head, ankle or the like. In other embodiments, the raw sensor data may represent any angular pose. In one embodiment, the placement of a thumb or finger about a touch sensitive ring or position of part of a ring with respect to another part of the ring provides pose data for menu mapping.

The pose data interpreter 422 determines current traversal coordinates from user input as well as the current traversal speed or speed. The pose data interpreter 422 comprises an angular movement processor 424 and a speed monitor 426.

The angular movement processor 424 may determine degrees of movement based upon input data an associate the degrees of movement with, e.g., latitudinal and longitudinal coordinates. The speed monitor 426 may monitor the speed in latitudinal and/or longitudinal directions.

The pose data interpreter 422 may also input a raw information from a button or switch and process or retransmit the signal as a selection signal to a selection logic of pose state determiner 430. For example, the pose data interpreter 422 may receive data indicating that a switch has changed state and/or that the switch has returned to a default or normal state. In response, the pose data interpreter 422 may communicate an instruction to the selection logic 438.

In some embodiments, the pose data interpreter 422 or a portion thereof may reside in another device 420. For instance, the pose data interpreter 422 may reside in a watch such as watch 240 in FIG. 2.

When the pose data interpreter 422 determines the pose data and transmits the pose data to the pose state determiner 430, the pose state determiner 430 may determine a current mapping 446, determine a new current pose location or current coordinates 445, determine the new current cell 447 that is associated with new current pose location, detect selection of a current cell, and interact with the audio output logic 452 to communicate the current mapping 446 to the user via audible items.

The pose state determiner 430 comprises a mapping logic 432, a hovering logic 433, a magnification logic 434, a cell associator 436, and a selection logic 438. The mapping logic 432 may determine the current mapping 446 and store the current mapping in current mapping 446. For instance, upon an initial execution of pose state determiner 430, pose state determiner 430 may select a built-in default mapping 466, a default mapping from user preferences 410, or another mapping indicated in user preferences 410. Furthermore, upon selection of a cell within the current mapping, mapping logic 432 may change the current mapping 446. For instance, if execution of the current cell involves entering a child mapping, the mapping logic 432 will change the current mapping 446 in memory 440 to the child mapping and store an indication of the parent mapping in map history 448 of memory 440.

In some embodiments, mapping logic 432 may also determine a new reference location to associate with the new current mapping 446, which maps relative mapping coordinates onto the new current mapping 446 based upon user preferences.

Hovering logic 433 may determine whether the user has hovered over a cell or remained at a cell long enough to reach a threshold for transmitting another audible item. In particular, the cell associator 436 may instruct audio output logic 450 to output a first audible item associated with a cell upon determining that the user traversed into a different cell. If the user maintains the current coordinates with the same cell for a threshold period of time, the hover logic 433 may continue to transmit audible items associated with the cell until no additional audible items are available to transmit or the user exits the cell. In some embodiments, each successive audible item may be associated with a different threshold. When no additional audible items are available to transmit, in some embodiments, hover logic 450 may repeatedly transmit one or more of the audible items. In other embodiments, the hover logic 433 may transmit each successive audible item after transmission of the prior audible item.

Magnification logic 434 may monitor the speed with which the user traverses a cell and determine a magnification for the current cell and, in some embodiments, cells adjacent to the current cell 447. In some embodiments, the cell is magnified by increasing the height and/or width of the cell. In many embodiments, the cells are not magnified unless the speed is sufficiently slow to indicate an interest in the cell by the user, wherein the interest may be a function of the speed and may be a setting that can be stored in user preferences 410.

The cell associator 436 may comprise logic to associate a cell with the current coordinates. For instance, upon receipt of new coordinates from the pose data interpreter 422, the cell associator 436 may determine whether the user traversed into a different cell or remained within the same cell. The cell associator 436 may store an indication of the current cell in current cell 447 of memory 440.

The selection logic 438 may, upon receipt of a selection signal, determine the selection of the current cell based upon the selection signal. If the execution of the cell involves execution of a function, the function may be executed and the pose state 442 may remain unchanged. On the other hand, if the execution of the cell involves entry into a child mapping, the selection logic 438 may communicate the same to the mapping logic 432 to update the current mapping 446.

The audio output logic 450 may determine and output an audible item for a cell at in response to an indication from pose state determiner 430. The audio output logic 450 may comprise an audible item determiner 452, a transfer function logic 454, and an audio output 456. The audible item determiner 452 may determine audible items for the current cell 446 based upon associations indicated by pose state determiner 430 and retrieve the audible item from audible items 462 in library 460. The audible item determiner 450 may then transmit the audible items via the audio output 456 to and audio output mechanism. In some embodiments, transfer function logic 454 may modify the audible item with a head related transfer function or the like prior to transmitting the audible item.

FIG. 5 illustrates a flow chart 500 of an embodiment for traversing cells via audible mapping. Flow chart 500 begins with receiving pose data including coordinates (element 505). The pose data interpreter of auditory mapper may receive the data, which may be raw data from, e.g., a pose sensor, or may be partially processed data. The pose data determiner may then determine the current coordinates associated with the pose data and determine the speed (element 510).

After determining the speed, the pose state determiner may determine the cell that is associated with current coordinates based upon current mapping (element 515) and may determine an audible item associated with the cell based upon an association between the cell and the audible item as well as between the current speed 444 and the audible item (element 520). For instance, if the user just arrived to the cell, a first audible item associated with the cell may be selected and transmitted by the audible mapper (element 522). On the other hand, if the first audible item has already been transmitted for the item and the user remains over the cell, hovering logic of the auditory mapper may determine that the first audible item for the current cell has been output and that the user has remained on the cell long enough to transmit a second audible item of to the user. The hover logic may continue to send out audible items upon reaching hovering thresholds until there are no more audible items for the cell. In other embodiments, the hovering logic may continue to repeat the last item.

Magnification logic may monitor the speed and adjust the size of the cell in accordance with a predetermined arrangement. In response to determining that the user reduced the speed over the current cell (element 525), the magnification logic may increase the size of the cell (element 530). In some embodiments, the size adjustments for the current cell and, in some embodiments, cells in close proximity to the current cell, are predetermined changes based upon predetermined durations spent at the cell. In other embodiments, the size of the cells may continuously be modified in accordance with a magnification curve such as the curve 149 in FIG. 1E.

At decision element 535, selection logic of the pose state determiner determines whether a selection signal has been received. If the selection is received, the pose state determiner determines whether the function associated with the current cell is associated with a child mapping of cells (element 540). If so, the pose state determiner selects the new mapping as the current mapping (element 560) and stores an indication of the prior mapping in memory so that the prior mapping or parent mapping may be returned to upon completion of activities in the child cell mapping. The flow chart then returns to element 505 to receive additional pose data to traverse the new child mapping.

On the other hand, if the cell function can simply execute or otherwise does not require maneuvering through a child mapping, the function associated with the current cell is executed and control is returned to the auditory mapper (element 545). If the user does nothing after executing the cell function or otherwise indicates that the user intends to exit the auditory mapper then the flow chart 500 ends (elements 550). Otherwise, the pose data determiner receives pose data at element 505 and the flow chart 500 continues.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates pose to auditory mapping. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for auditory mapping, the method comprising:
   receiving user pose data, the user pose data comprising data indicative of a first rotation about a first axis and a second rotation about a second axis;
   associating the user pose data with a user pose location, wherein the user pose location comprises a set of coordinates within a first mapping of a first set of cells, each cell of the first set of cells having a size defined by a width and a height, and coordinates within the first mapping;
   associating the user pose location with a first cell in the first mapping;
   transmitting a first audible item to a user interface to output audio associated with the first cell;
   updating the user pose location based upon receipt of subsequent user pose data;
   transmitting a second audible item associated with the first cell to the user interface to output audio after the user pose location remains associated with the first cell for a threshold period of time; and
   magnifying at least the first cell in response to a duration for which the user pose location remains associated with the first cell; wherein magnifying the first cell comprises increasing at least one of the height and the width of the first cell.

2. The method of claim 1, wherein the first mapping comprises one or more columns within a range of rotation about the first axis and one or more rows within a range of rotation about the second axis, each row of cells in the first mapping comprising a portion of the range of rotation about the first axis, each column comprising a portion of the range of rotation about the second axis.

3. The method of claim 1, wherein the magnifying comprises increasing at least one of the height and the width of the first cell in response to hovering over the first cell.

4. The method of claim 1, wherein the magnifying comprises increasing at least one of the height and the width of the first cell in relation to a speed of traversal of the first cell.

5. The method of claim 1, further comprising receiving user pose data to awake the user interface from an idle state to the first mapping, wherein the first mapping comprises main menu items associated with the first set of cells, wherein at least one of the first set of cells comprises a drop zone to return the user interface to the idle state.

6. The method of claim 1, further comprising receiving data to indicative of a click of a button and, in response, executing a function associated with the first cell at the user pose location.

7. The method of claim 6, wherein executing a function associated with the first cell at the user pose location comprises entering a child mapping associated with the first cell at the user pose location.

8. The method of claim 6, further comprising receiving user pose data comprising data indication of rotations about the first axis and the second axis associated with a top zone cell in the child mapping and, in response, entering the first mapping.

9. The method of claim 1, further comprising receiving data indicative of pressing and holding a button and, in response, entering a child mapping associated with the first cell at the user pose location.

10. The method of claim 9, further comprising receiving data indicative of releasing the button and, in response, executing a function associated with a cell in the child mapping at the user pose location.

11. An apparatus for auditory mapping, the apparatus comprising:
    a user interface comprising hardware;
    logic coupled with the user interface, wherein the logic comprises:
      logic to receive user pose data, the user pose data comprising data indicative of a first rotation about a first axis and a second rotation about a second axis;
      logic to associate the user pose data with a user pose location, wherein the user pose location comprises a set of coordinates within a first mapping of a first set of cells, each cell of the first set of cells having a size defined by a width and a height, and coordinates within the first mapping;
      logic to associate the user pose location with a first cell in the first mapping;
      logic to transmit a first audible item to the user interface to output audio associated with the first cell;
      logic to update the user pose location based upon receipt of subsequent user pose data;
      logic to transmit a second audible item associated with the first cell to the user interface to output audio after the user pose location remains associated with the first cell for a threshold period of time; and
      logic to magnify at least the first cell in response to a duration for which the user pose location remains associated with the first cell;
      wherein magnifying the first cell comprises increasing at least one of the height and the width of the first cell.

12. The apparatus of claim 11, wherein the first mapping comprises one or more columns within a range of rotation about the first axis and one or more rows within a range of rotation about the second axis, each row of cells in the first mapping comprising a portion of the range of rotation about the first axis, each column comprising a portion of the range of rotation about the second axis.

13. The apparatus of claim 11, wherein the logic to magnify comprises logic to increase at least one of the height and the width of the first cell in response to hovering over the first cell.

14. The apparatus of claim 11, wherein the logic to magnify comprises logic to increase at least one of the height and the width of the first cell in relation to a speed of traversal of the first cell.

15. The apparatus of claim 11, wherein logic to receive user pose data comprises logic to receive user pose data to awake the user interface from an idle state to the first mapping, wherein the first mapping comprises main menu items associated with the first set of cells, wherein at least one of the first set of cells comprises a drop zone to return the user interface to the idle state.

16. The apparatus of claim 11, wherein the logic to receive user pose data comprises logic to receive data indicative of a click of a button and, in response, to execute a function associated with the first cell at the user pose location.

17. The apparatus of claim 16, wherein the logic to execute a function associated with the first cell at the user pose location comprises logic to enter a child mapping associated with the first cell at the user pose location.

18. The apparatus of claim 11, wherein the logic to receive user pose data comprises logic to receive user pose data comprising data indication of rotations about the first axis and the second axis associated with a top zone cell in the child mapping and, in response, to enter the first mapping.

19. The apparatus of claim 11, wherein the logic to receive user pose data comprises logic to receive data indicative of pressing and holding a button and, in response, to enter a child mapping associated with the first cell at the user pose location.

20. The apparatus of claim 11, wherein the logic to receive user pose data comprises logic to receive data indicative of releasing the button and, in response, to execute a function associated with a cell in the child mapping at the user pose location.

21. A system for auditory mapping, the system comprising:
a wireless transmitter/receiver comprising hardware; and
an auditory mapper coupled with the wireless transmitter/receiver, comprising logic to receive user pose data, the user pose data comprising data indicative of a first rotation about a first axis and a second rotation about a second axis; to associate the user pose data with a user pose location, wherein the user pose location comprises a set of coordinates within a first mapping of a first set of cells, each cell of the first set of cells having a size defined by a width and a height, and coordinates within the first mapping; to associate the user pose location with a first cell in the first mapping; to transmit a first audible item to the user interface to output audio associated with the first cell; to update the user pose location based upon receipt of subsequent user pose data; to transmit a second audible item associated with the first cell to the user interface to output audio after the user pose location remains associated with the first cell for a threshold period of time; and to magnify at least the first cell in response to a duration for which the user pose location remains associated with the first cell; wherein magnifying the first cell comprises increasing at least one of the height and the width of the first cell.

22. The system of claim 21, wherein the apparatus further comprises one or more antennas coupled with the wireless transmitter/receiver and the auditory mapper comprises one or more processors and memory.

23. The system of claim 21, wherein the first mapping comprises one or more columns within a range of rotation about the first axis and one or more rows within a range of rotation about the second axis, each row of cells in the first mapping comprising a portion of the range of rotation about the first axis, each column comprising a portion of the range of rotation about the second axis.

24. The system of claim 21, wherein the logic to magnify comprises logic to increase at least one of the height and the width of the first cell in response to hovering over the first cell.

25. The system of claim 21, wherein the logic to magnify comprises logic to increase at least one of the height and the width of the first cell in relation to a speed of traversal of the first cell.

26. The system of claim 21, wherein logic to receive user pose data comprises logic to receive user pose data to awake the user interface from an idle state to the first mapping, wherein the first mapping comprises main menu items associated with the first set of cells, wherein at least one of the first set of cells comprises a drop zone to return the user interface to the idle state.

27. A computer program product for auditory mapping, the computer program product comprising:
a non-transitory computer useable medium having a computer useable program code embodied therewith wherein the computer useable medium is not a propagation medium, the computer useable program code comprising: computer useable program code configured to perform operations, the operations comprising:
receiving user pose data, the user pose data comprising data indicative of a first rotation about a first axis and a second rotation about a second axis;
associating the user pose data with a user pose location, wherein the user pose location comprises a set of coordinates within a first mapping of a first set of cells, each cell of the first set of cells having a size defined by a width and a height, and coordinates within the first mapping;
associating the user pose location with a first cell in the first mapping;
transmitting a first audible item to a user interface to output audio associated with the first cell;
updating the user pose location based upon receipt of subsequent user pose data;
transmitting a second audible item associated with the first cell to the user interface to output audio after the user pose location remains associated with the first cell for a threshold period of time; and
magnifying at least the first cell in response to a duration for which the user pose location remains associated with the first cell; wherein magnifying the first cell comprises increasing at least one of the height and the width of the first cell.

28. The computer program product of claim 27, wherein the operations further comprise receiving user pose data to awake the user interface from an idle state to the first mapping, wherein the first mapping comprises main menu items associated with the first set of cells, wherein at least one of the first set of cells comprises a drop zone to return the user interface to the idle state.

29. The computer program product of claim 27, wherein the operations further comprise receiving data to indicative of a click of a button and, in response, executing a function associated with the first cell at the user pose location.

30. The computer program product of claim 27, wherein the operations further comprise receiving data indicative of pressing and holding a button and, in response, entering a child mapping associated with the first cell at the user pose location.

* * * * *